United States Patent
Matsumoto et al.

(10) Patent No.: US 6,174,943 B1
(45) Date of Patent: Jan. 16, 2001

(54) FLAME-RETARDANT THERMOPLASTIC RESIN COMPOSITION

(75) Inventors: Kazuaki Matsumoto, Yao; Tadashi Koyama, Toyonaka; Yoshitaka Ono, Settsu; Katsutoyo Fujita, Kawanishi; Yoichi Ohara, Kato-gun; Kazushi Hirobe, Osaka, all of (JP)

(73) Assignee: Kaneka Corporation, Osaka (JP)

( * ) Notice: Under 35 U.S.C. 154(b), the term of this patent shall be extended for 0 days.

(21) Appl. No.: 09/043,999

(22) PCT Filed: Feb. 27, 1997

(86) PCT No.: PCT/JP97/00575

§ 371 Date: Apr. 2, 1998

§ 102(e) Date: Apr. 2, 1998

(87) PCT Pub. No.: WO97/31980

PCT Pub. Date: Sep. 4, 1997

(30) Foreign Application Priority Data

Feb. 29, 1996 (JP) .................................................... 8-043856
Feb. 29, 1996 (JP) .................................................... 8-043858
Sep. 27, 1996 (JP) .................................................... 8-256802

(51) Int. Cl.[7] .................................................... C08K 3/32
(52) U.S. Cl. .................. 524/115; 524/107; 524/449; 524/417; 524/502; 524/523; 524/513; 524/537; 524/605; 524/539; 524/540; 524/127; 524/141; 524/143
(58) Field of Search .................................. 524/115, 107, 524/449, 417, 502, 523, 513, 537, 605, 539, 540, 127, 141, 143

(56) References Cited

U.S. PATENT DOCUMENTS

| 4,092,288 | * | 5/1978 | Calkins et al. | .................... | 524/154 |
| 4,692,488 | * | 9/1987 | Kress et al. | .................... | 524/139 |
| 5,204,394 | * | 4/1993 | Gosens et al. | .................... | 524/125 |
| 5,637,643 | * | 6/1997 | Umeda et al. | .................... | 524/537 |

FOREIGN PATENT DOCUMENTS

| 0 709 432 | 5/1996 | (EP) . |
| 54-54165 | 4/1979 | (JP) . |
| 5-222283 | 8/1993 | (JP) . |
| 6-65416 | 3/1994 | (JP) . |
| 6-192553 | 7/1994 | (JP) . |
| 6-248160 | 9/1994 | (JP) . |

* cited by examiner

*Primary Examiner*—Robert Dawson
*Assistant Examiner*—Kuo-Liang Peng
(74) *Attorney, Agent, or Firm*—Armstrong, Westerman, Hattori, McLeland & Naughton

(57) ABSTRACT

A flame retarded thermoplastic resin composition comprising (R) a thermoplastic resin comprising (A) a polycarbonate resin and (B) an aromatic polyester resin in an (A)/(B) ratio of 99/1 to 50/50 by weight, and per 100 parts by weight of the thermoplastic resin (R), (C) 0.5 to 100 parts by weight of a silicate compound and (D) 0.5 to 30 parts by weight of an organic phosphorus based flame retarder. The composition can exhibit excellent flame resistance and anti-drip property without containing a halogen atom and, moreover, has excellent properties such as heat resistance, mechanical strength, solvent resistance, surface property of moldings, and dimensional stability.

11 Claims, No Drawings

FLAME-RETARDANT THERMOPLASTIC RESIN COMPOSITION

TECHNICAL FIELD

The present invention relates to a flame retarded thermoplastic resin composition which exhibits an excellent flame resistance and an excellent dripping resistance without containing a halogen atom and, moreover, which is also excellent in heat resistance, mechanical strength, solvent resistance, surface property of moldings, and dimensional stability.

BACKGROUND ART

Recently, there are many cases, particularly in uses of electric and electronic parts, where a high flame resistance coming up to a V-0 rating of UL-94 (Underwriters' Laboratory flammability test) or the like is demanded for resins used in order to secure a safety against fire. Thus, various flame retarders have been developed and investigated.

In case of imparting such a high flame resistance to resin compositions, halogen compounds have been generally used as a flame retarder, which are used, as occasion demands, in combination with a flame retarding assistant such as antimony trioxide. However, the halogen based flame retarders have a large flame retarding effect, but free halogen gas and halogen compounds produced by decomposition of the flame retarders at the time of processing of resins may corrode surfaces of a cylinder and a die of extruders for compounding, or may corrode metallic parts, when the resin compositions are used as electric and electronic parts, to cause troubles such as contact fault or conduction fault. Also, in recent years, there is a movement to completely regulate the use of halogen-containing resins with the European countries as the center figure. Further, the addition of a flame retarding assistant such as antimony trioxide has the defect that the heat stability of resins is deteriorated when melting them at high temperatures. For such reasons, it has been desired to develop a flame retarded thermoplastic resin composition containing no halogen based flame retarder such as chlorine compound and bromine compound and containing no flame retarding assistant such as antimony oxide.

As such a flame retarded resin composition, proposed is for instance a resin composition wherein an alloy of a polycarbonate resin and a polyester resin is flame-retarded by a flame retarder other than halogen based flame retarders. Japanese Patent Publication Kokai No. 64-70555 and No. 6-192553 disclose that flame retarded resin compositions containing no chlorine or bromine atom are obtained by adding a graft copolymer, a phosphorus based flame retarder such as triaryl phosphate or oligomeric phosphate and a fluorinated polyolefin to a polycarbonate/polyalkylene terephthalate alloy. If it is attempted to impart a flame retardancy with only the use of a phosphorus based flame retarder, so-called dripping phenomenon that a burnt resin drips at the time of flaming of molded articles occurs, thus failing to pass a UL-94 rating of V-0, and accordingly it is necessary, as proposed, to add a fluorinated polyolefin in order to prevent the dripping.

These flame retarded resin compositions using phosphorus based flame retarders have the problem that since other physical properties are deteriorated if it is attempted to achieve a high level of flame resistance, it is very difficult to satisfy both the flame resistance and the physical properties such as heat resistance and mechanical strength. Also, since fluorinated polyolefins are expensive, the addition thereof leads to increase in cost of the resin compositions and, therefore, it is desirable to use it in an amount as small as possible. However, if the amount is decreased, dispersion failure of fluorinated polyolefin is easy to occur, thus there arises a trouble that the flame resistance varies depending on molding processing conditions, and if the fluorinated polyolefin is added in a large amount, there arises a trouble that the appearance of molded products is decreased or the fluidity and molding processability are deteriorated. Further, because of a growing interest in environmental problem in recent years, there is a movement to restrict also the use of fluorine-containing resins in addition to bromine and chlorine based flame retarders. For such reasons, it has been demanded to develop a method for preventing the dripping of resins at burning without adding a fluorine-containing resin.

Also, Japanese Patent Publication Kokai No. 7-26129 discloses a technolgy for flame-retarding a polycarbonate resin by adding thereto a polyphosphate flame retarder, a fluorinated polyolefin, mica, talc and the like. However, such a composition is limited in the range of utilization, because of poor fluidity and chemical resistance of the resin.

DISCLOSURE OF THE INVENTION

The present inventors have made an intensive study in order to solve the problems as mentioned above. As a result, the present inventors have found that when a silicate compound is added to a composition comprising a polycarbonate resin, an aromatic polyester resin and an organic phosphorus based flame retarder, dripping occurring at the time of burning of molded products can be prevented without adding a fluorine-containing resin, so a flame retarded thermoplastic resin composition containing substantially no halogen atom such as chlorine and bromine can be obtained, thus we have accomplished the present invention.

The present invention provides a flame retarded thermoplastic resin composition comprising:

(R) a thermoplastic resin comprising (A) a polycarbonate resin and (B) an aromatic polyester resin in an (A)/(B) ratio of 99/1 to 50/50 by weight, (C) 0.5 to 100 parts by weight of a silicate compound, and (D) 0.5 to 30 parts by weight of an organic phosphorus based flame retarder, respectively, per 100 parts by weight of said thermoplastic resin (R).

The flame retarded thermoplastic resin composition of the present invention is excellent in flame resistance and anti-dripping property and, moreover, has excellent properties such as heat resistance, mechanical strength, solvent resistance, surface property of molded products, dimensional stability and impact resistance. The impact resistance of the composition can be further improved by adding (E) an elastomeric resin having at least one glass transition temperature at a temperature of not more than 0° C. to the composition. Also, the solvent resistance and the heat stability and discoloration resistance at the time of melting can be improved by adding (F) an epoxy compound containing substantially no halogen atom in the molecule to the composition.

BEST MODE FOR CARRYING OUT THE INVENTION

The polycarbonate resin (A) used in the present invention is a thermoplastic resin obtained by reacting a phenolic compound having a valency of at least 2 with a carbonic acid diester such as phosgene or diphenyl carbonate, and exhibits excellent properties such as impact resistance, heat distortion resistance and mechanical strength.

Various phenol compounds having a valency of at least 2 can be used. In particular, 2,2-bis(4-hydroxyphenyl)propane (common name bisphenol A) which is a dihydric phenol compound is preferred from the viewpoints of economy and mechanical strength. Examples of the dihydric phenol compounds other than bisphenol A are, for instance, a dihydroxydiarylalkane such as bis(4-hydroxyphenyl)methane, bis(4-hydroxyphenyl)phenylmethane, bis(4-hydroxyphenyl) naphthylmethane, bis(4-hydroxyphenyl)-(4-isopropylphenyl)methane, bis(3,5-dimethyl-4-hydroxyphenyl)methane, 1,1-bis(4-hydroxyphenyl)ethane, 1-naphthyl-1,1-bis(4-hydroxyphenyl)ethane, 1-phenyl-1,1-bis(4-hydroxyphenyl)ethane, 1,2-bis(4-hydroxyphenyl) ethane, 2-methyl-1,1-bis(4-hydroxyphenyl)propane, 2,2-bis (3,5-dimethyl-4-hydroxyphenyl)propane, 1-ethyl-1,1-bis(4-hydroxyphenyl) propane, 2,2-bis(3-methyl-4-hydroxyphenyl)propane, 1,1-bis(4-hydroxyphenyl)butane, 2,2-bis(4-hydroxyphenyl)butane, 1,4-bis(4-hydroxyphenyl) butane, 2,2-bis(4-hydroxyphenyl)pentane, 4-methyl-2,2-bis (4-hydroxyphenyl)pentane, 2,2-bis(4-hydroxyphenyl) hexane, 4,4-bis(4-hydroxyphenyl)heptane, 2,2-bis(4-hydroxyphenyl)nonane, 1,10-bis(4-hydroxyphenyl) decane, or 1,1-bis(4-hydroxyphenyl)-3,3,5-trimethylcyclohexane; a dihydroxydiarylcycloalkane such as 1,1-bis(4-hydroxyphenyl)cyclohexane or 1,1-bis(4-hydroxyphenyl )cyclodecane; a dihydroxydiarylsulfone such as bis(4-hydroxyphenyl)sulfone or bis(3,5-dimethyl- 4-hydroxyphenyl)sulfone; a dihydroxydiaryl ether such as bis(4-hydroxyphenyl)ether or bis(3, 5-dimethyl-4-hydroxyphenyl)ether; a dihydroxydiaryl ketone such as 4,4'-dihydroxybenzophenone or 3,3',5,5'-tetramethyl-4,4'-dihydroxybenzophenone; a dihydroxydiarylsulfide such as bis(4-hydroxyphenyl)sulfide, bis(3-methyl-4-hydroxyphenyl)sulfide or bis(3,5-dimethyl-4-hydroxyphenyl)sulfide; a dihydroxydiarylsulfoxide such as bis(4-hydroxyphenyl)sulfoxide; a dihydroxydiphenyl such as 4,4'-dihydroxydiphenyl; a dihydroxyarylfluorene such as 9,9-bis(4-hydroxyphenyl)fluorene; and the like. In addition to the dihydric phenol compounds as mentioned above, there can be used a dihydroxybenzene such as hydroquinone, resorcinol or methylhydroquinone; and a dihydroxynaphthalene such as 1,5-dihydroxynaphthalene or 2,6-dihydroxynaphthalene.

Further, phenolic compounds having a valency of 3 or more can be used so long as the obtained polycarbonate resins maintain a thermoplasticity. Examples of the tri or more hydric phenol compounds are, for instance, 2,4,4'-trihydroxybenzophenone, 2,2',4,4'-tetrahydroxybenzophenone, 2,4,4'-trihydroxyphenylether, 2,2',4,4'-tetrahydroxyphenylether, 2,4,4'-trihydroxydiphenyl-2-propane, 2,2'-bis(2,4-dihydroxyphenyl)propane, 2,2',4,4'-tetrahydroxydiphenylmethane, 2,4,4'-trihydroxydiphenylmethane, 1-[α-methyl-α-(4'-dihydroxyphenyl)ethyl]-3-[α',α'-bis(4"-hydroxyphenyl) ethyl]benzene, 1-[α-methyl-α-(4'-dihydroxyphenyl)ethyl]-4-[α',α'-bis(4"-hydroxyphenyl)ethyl]benzene, α,α',α"-tris (4-hydroxyphenyl)1,3,5-triisopropylbenzene, 2,6-bis(2-hydroxy-5'-methylbenzyl)-4-methylphenol, 4,6-dimethyl-2, 4,6-tris(4'-hydroxyphenyl)-2-heptene, 4,6-dimethyl-2,4,6-tris(4'-hydroxyphenyl)heptane, 1,3,5-tris(4'-hydroxyphenyl) benzene, 1,1,1-tris(4-hydroxyphenyl)ethane, 2,2-bis[4,4-bis (4'-hydroxyphenyl)cyclohexyl]propane, 2,6-bis(2'-hydroxy-5'-isopropylbenzyl)-4-isopropylphenol, bis[2-hydroxy-3-(2'-hydroxy-5'-methylbenzyl)-5-methylphenyl]methane, bis [2-hydroxy-3-(2'-hydroxy-5-isopropylbenzyl)-5-methylphenyl]methane, tetrakis(4-hydroxyphenyl)methane, tris(4-hydroxyphenyl)phenylmethane, 2',4',7-trihydroxyflavan, 2,4,4-trimethyl-2',4',7-trihydroxyflavan, 1,3-bis(2',4'-dihydroxyphenylisopropyl)benzene, tris(4'-hydroxyphenyl)amyl-s-triazine, and the like.

These phenol compounds may be used alone or in admixture thereof.

The polycarbonate resins (A) may have a branched structure, and they may contain a component to provide branched polycarbonate resins (a branching agent), as occasion demands, so long as the chemical resistance, heat stability and mechanical strength are not impaired. Examples of the branching agent used for obtaining branched polycarbonate resins are, for instance, in addition to tri or more hydric phenol compounds, phloroglucinol, mellitic acid, trimellitic acid, trimellityl chloride, trimellitic anhydride, gallic acid, n-propyl gallate, protocatechuic acid, pyromellitic acid, pyromellitic acid dianhydride, α-resorcylic acid, β-resorcylic acid, resorcylaldehyde, isatinbis(o-cresol), 4-chloroformylphthalic anhydride, benzophenonetetracarboxylic acid, and the like.

Also, a polycarbonate-polyorganosiloxane copolymer composed of a polycarbonate portion and a polyorganosiloxane portion may be used as the polycarbonate resin (A). It is preferable that the degree of polymerization of the polyorganosiloxane portion is at least 5.

In addition, it is possible to use, as the polycarbonate resin (A), a copolymer prepared using a linear aliphatic dicarboxylic acid such as adipic acid, pimelic acid, suberic acid, azelaic acid, sebacic acid or decanedicarboxylic acid as a comonomer.

Further, various known terminating agents which have been used in the polymerization can be used as a component for the polycarbonate resin (A), as occasion demands, so long as the chemical resistance, heat stability and mechanical strength are not impaired. Examples of the terminating agent are, for instance, phenol, p-cresol, p-t-butylphenol, p-t-octylphenol, p-cumylphenol, nonylphenol and the like.

Examples of the above-mentioned carbonic acid diester are, for instance, a diaryl carbonate such as diphenyl carbonate, a dialkyl carbonate such as dimethyl carbonate or diethyl carbonate, and the like.

The molecular weight of the polycarbonate resin (A) is not particularly limited, but from the viewpoint of mechanical strength of the obtained resin, it is preferable that the viscosity average molecular weight thereof is at least 10,000, especially at least 12,000, more especially at least 13,000. It is also preferable from the viewpoint of molding processability that the viscosity average molecular weight is at most 60,000, especially at most 50,000, more especially at most 40,000.

Typical examples of the polycarbonate resin (A) as mentioned above are, for instance, a polycarbonate resin obtained by reacting bisphenol A with diphenyl carbonate, and a polycarbonate resin obtained by reacting bis(4-hydroxylphenyl)methane with diphenyl carbonate.

The aromatic polyester resin (B) used in the present invention is a thermoplastic aromatic polyester resin obtained by polycondensation of an aromatic carboxylic acid component having a valency of at least 2 and an alcohol and/or phenol component having a valency of at least 2. It is a component used for imparting a property such as a solvent resistance or a fluidity in molding to the composition of the present invention.

Bivalent or higher valent aromatic carboxylic acids having 8 to 22 carbon atoms and derivatives thereof capable of forming ester are used as the above-mentioned bivalent or higher valent aromatic carboxylic acid component. Examples of the aromatic carboxylic acid component are bivalent aromatic carboxylic acids such as terephthalic acid, isophthalic acid, naphthalenedicarboxylic acid, bis(p-carboxyphenyl)methane, anthracenedicarboxylic acid, 4,4'-diphenylcarboxylic acid, 1,2-bis(phenoxy)ethane-4,4'-dicarboxylic acid and diphenylsulfonedicarboxylic acid, trivalent or higher valent aromatic carboxylic acids such as trimesic acid, trimellitic acid and pyromellitic acid, and ester-formable derivatives of them. Among them, terephthalic acid, isophthalic acid and naphthalenedicaboxylic acid are preferred from the viewpoints of easiness in handling, easiness in reaction and good balance between heat resistance and fluidity of the obtained resins. These may be used alone or in admixture thereof.

The above-mentioned alcohol and/or phenol component having a valency of at least 2 includes an aliphatic compound having 2 to 15 carbon atoms, an alicyclic compound having 6 to 20 carbon atoms and an aromatic compound having 6 to 40 carbon atoms, which have at least two hydroxyl groups in the molecule, and derivatives of these compounds capable of forming ester. Examples of the alcohol and/or phenol component are an aliphatic diol such as ethylene glycol, propylene glycol, butanediol, hexanediol, decanediol or neopentyl glycol; an alicyclic diol such as cyclohexanedimethanol, cyclohexanediol or 2,2-bis(4-hydroxycyclohexyl)propane; an aromatic diol such as 2,2-bis(4-hydroxyphenyl)propane or hydroquinone; a trihydric or higher hydric alcohol such as glycerol or pentaerythritol; and ester-formable derivatives thereof. Among them, ethylene glycol and butanediol are preferred from the viewpoints of easiness in handling, easiness in reaction and good balance between heat resistance and fluidity of the obtained resins. These may be used alone or in admixture thereof.

In addition to the above-mentioned components, a carboxylic acid, e.g., a bivalent or higher valent aliphatic carboxylic acid having 4 to 12 carbon atoms or a bivalent or higher valent alicyclic carboxylic acid having 8 to 15 carbon atoms, and an ester-formable derivative thereof may be partly copolymerized in the aromatic polyester resin (B). Examples thereof are a dicarboxylic acid such as adipic acid, sebacic acid, azelaic acid, dodecanedioic acid, maleic acid, 1,3-cyclohexanedicarboxylic acid or 1,4-cyclohexanedicarboxylic acid, and an ester-formable derivative thereof. Also, an oxy-acid such as p-hydroxybenzoic acid, its ester-formable derivative, a cyclic ester such as ε-caprolactone can be used as the comonomer. Further, there can be used an aromatic polyester resin wherein a polyalkylene glycol segment such as polyethylene glycol, polypropylene glycol, poly(ethylene oxide-propylene oxide) block and/or random copolymer, addition polymerization product of ethylene oxide to bisphenol A, addition polymerization product of propylene oxide to bisphenol A, addition polymerization product of tetrahydrofuran to bisphenol A or polytetramethylene glycol is partly copolymerized in the polymer chain. Preferably, the proportion of these other components in the aromatic polyester resin (B) is at most about 20% by weight, especially at most about 15% by weight, more especially at most about 10% by weight.

From the viewpoint that the obtained composition is excellent in a balance of physical properties such as heat resistance, fluidity and chemical resistance, it is preferable that the aromatic polyester resin (B) is a polyalkylene terephthalate resin having at least 80% by weight, especially at least 85% by weight, more especially at least 90% by weight, of alkylene terephthalate units.

It is preferable that the aromatic polyester resin (B) has an intrinsic viscosity of 0.30 to 2.00 dl/g, especially 0.40 to 1.80 dl/g, more especially 0.50 to 1.60 dl/g, measured at 25° C. in a mixed solvent of phenol/tetrachloroethane=1/1 by weight. If the intrinsic viscosity is less than the above range, the mechanical strength of moldings is lowered, and if the intrinsic viscosity is more than the above range, the molding processing tends to become difficult.

Typical examples of the aromatic polyester resin (B) are polyethylene terephthalate, polyethylene isophthalate, polyteramethylene terephthalate, polyethylene naphthalate, polyteramethylene naphthalate, polycyclohexanedimethylene terephthalate, polyarylate, and copolymers of these polyesters with polyethylene glycol, polypropylene glycol, polytetramethylene glycol or poly-ε-caprolactone. Particularly, polyethylene terephthalate and polytetramethylene terephthalate are preferred.

The aromatic polyester resins (B) may be used alone or in admixture of those having different copolymerization components or intrinsic viscosity.

Such aromatic polyester resins (B) can be prepared by a usual process for the preparation of polyesters.

The polycarbonate resin (A)/aromatic polyester resin (B) ratio is from 99/1 to 50/50 by weight, preferably 95/5 to 55/45 by weight, more preferably 90/10 to 60/40 by weight. If the weight ratio is more than 99/1, the solvent resistance is lowered, and if the weight ratio is less than 50/50, the impact strength and heat resistance of the obtained moldings are lowered.

The silicate compound (C) in the present invention is used for the purposes of preventing dripping which occurs when molded products are burnt and of improving the flame retarding effect, while improving various physical properties such as heat resistance, mechanical strength and modulus with suppressing the anisotropy in shrinkage of resins.

Such silicate compounds are typically compounds including a chemical composition of $SiO_2$ unit. The shape thereof is not particularly limited, and is typically powdery, particulate or granular, needle-like and plate-like forms. The silicate compounds may be natural ones or synthetic ones. Typical examples of the silicate compound (C) are magnesium silicate, aluminum silicate, calcium silicate, talc, mica, wollastonite, kaolin, diatomaceous earth, smectites, and the like. Particularly, mica, talc, kaolin and smectites are preferred from the viewpoints that molded products obtained from the resin composition are excellent in heat resistance and mechanical strength in addition to having an effect of suppressing the anisotropy of the molded products. Mica and talc are more preferred from the viewpoint of excellent effects of preventing the dripping of molded products and improving the flame resistance. The silicate compounds may be used alone or in admixture thereof.

The mica used as the component (C) is not particularly limited in its kind, and can be suitably selected from potashmica (muscovite), phlogopite, sericite, biotite, paragonite, and synthetic mica.

The mica may be surface-treated in order to raise the adhesion to the resins. A silane coupling agent having epoxy group such as an epoxysilane is preferable as the surface treating agent because of not lowering physical properties of the resins. The method of the surface treatment is not particularly limited, and a usual surface treating method is adoptable.

It is preferable to use a mica having a weight average flake size of 1 to 40 μm for the reasons that the flame retarding effect and the anti-drip effect are raised to a higher level, the processability in melt-kneading is improved and the impact strength of obtained molded products is improved. Mica having a weight average flake size of 2 to 37 μg, particularly 3 to 35 μm, is more preferred. If the weight average flake size is less than 1 μm, the bulk density of the mica becomes so high that it becomes difficult to knead the resin component therewith at the time of the melt-kneading. If the weight average flake size is more than 40 μm, the impact strength of molded products and the anti-drip effect tend to lower.

The weight average flake size of mica in the present invention is indicated by a value corresponding to an opening of a micro-sieve through which 50% by weight of a powder subjected to a measurement has passed, in the measurement wherein the powder is sieved by micro-sieves having various openings and the results are plotted on a Rosin-Rammlar diagram.

These micas may be used alone or in admixture of those different in particle size, kind or surface treating agent.

The talc used as the component (C) is preferably those having a weight average particle size of at least 1.0 μm and a bulk specific volume of at most 8.0 ml/g for the reasons that the flame retarding effect and anti-drip effect can be raised to a higher level, the processability in melt kneading is improved and the impact strength of the obtained moldings is improved. The weight average particle size is more preferably from 1.1 to 30 μm, further preferably from 1.2 to 20 μm. Also, the bulk specific volume is more preferably at most 7.0 ml/g, further preferably at most 6.0 ml/g. If the weight average particle size is less than 1.0 μm or the bulk specific volume is more than 8.0 ml/g, there is a tendency that the effect to prevent dripping at the time of burning of moldings is inferior in addition to difficulty in melt-kneading with the resin component. If the weight average particle size is more than 30 μm, there is a case that the impact strength of the moldings lowers.

The weight average particle size of talc in the present invention is indicated by a value corresponding to an opening of a micro-sieve through which 50% of the whole weight of a powder subjected to a measurement has passed, when the powder is sieved by micro-sieves having various openings.

The kind, place of production and the like of the talc used in the present invention are not particularly limited, and the talc can be suitably selected from commercially available ones. The talc may be surface-treated with a surface treating agent in order to raise the adhesion to the thermoplastic resin (R). A silane coupling agent having epoxy group such as an epoxysilane is preferable as the surface treating agent because of not lowering physical properties of the thermoplastic resins (R). The method for the surface-treatment is not particularly limited, and a usual surface treating method is adoptable.

The talc may be used alone or in admixture of those different in particle size, kind, surface treating agent and the like.

The amount of the silicate compound (C) is from 0.5 to 100 parts by weight, preferably 1 to 70 parts by weight, more preferably 2 to 50 parts by weight, per 100 parts by weight of the thermoplastic resin (R) composed of the polycarbonate resin (A) and the aromatic polyester resin (B). If the amount of the silicate compound (C) is less than 0.5 part by weight, the flammability is not sufficiently improved such that the obtained moldings cause dripping at the time of burning and, in addition thereto, the heat resistance and mechanical strength are also lowered. On the other hand, if the amount is more than 100 parts by weight, the impact resistance and surface property of the obtained moldings are lowered and, moreover, it becomes difficult to knead with the resin in melt-kneading thereof.

The silicate compound (C) can exhibit an effect of preventing the dripping in burning of molded products without using a fluorine-containing resin. However, in order to further improve the drip-preventing effect, it may be used in combination with a fluorine-containing resin (a fluorinated polyolefin, etc.) such as polytetrafluoroethylene. In case of the combination use, it is preferable to use the fluorine-containing resin in an amount of about 0.005 to about 1 part by weight per 100 parts by weight of a composition composed of the components (A) to (D), from the viewpoint of a balance between the cost and the drip-preventing effect.

The organic phosphorus based flame retarder (D) used in the present invention includes a phosphate, a phosphonate, a phosphinate, a phosphine oxide, a phosphite, a phosphonite, a phosphinite, a phosphine, and the like. Examples of the phosphorus based flame retarder (D) are, for instance, trimethyl phosphate, triethyl phosphate, tributyl phosphate, tri(2-ethylhexyl) phosphate, tributoxyethyl phosphate, triphenyl phosphate, tricresyl phosphate, trixylenyl phosphate, tris(isopropylphenyl) phosphate, tris (phenylphenyl) phosphate, trinaphthyl phosphate, cresyldiphenyl phosphate, xylenyldiphenyl phosphate, diphenyl (2-ethylhexyl) phosphate, di(isopropylphenyl)phenyl phosphate, phenyldicresyl phosphate, di-2-ethylhexyl phsophate, monoisodecyl phosphate, 2-acryloyloxyethyl acid phosphate, 2-methacryloyloxyethyl acid phosphate, diphenyl-2-acryloyloxyethyl phosphate, diphenyl-2-methacryloyloxyethyl phosphate, triphenyl phosphite, trisnonylphenyl phosphite, tristridecyl phosphite, dibutyl hydrogen phosphite, triphenyl phosphine oxide, tricrysyl phosphine oxide, diphenyl methanephosphonate, diethyl phenylphosphonate and other organic phosphorus compounds, and condensed phosphoric acid esters. The organic phosphorus based flame retarders may be used alone or in admixture thereof.

As the organic phosphorus based flame retarder (D), phosphoric acid ester compounds of the formula (I):

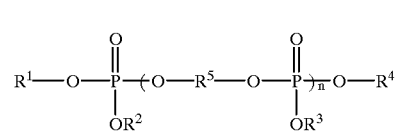

wherein $R^1$ to $R^4$ are a monovalent aromatic or aliphatic group, $R^5$ is a bivalent aromatic group, n is 0 to 16, and n groups $R^3$ and n groups $R^5$ may be the same or different, respectively, are particularly preferred from the viewpoints that they are excellent in flame retardancy and, moreover, they are easy to handle. Condensed phosphoric acid esters represented by the formula (I) wherein n is from 1 to 16 are more preferable because of low contamination to metallic portions such as die in molding.

Typical examples of the phosphoric acid ester represented by the formula (I) (n=0) are triphenyl phosphate, tricresyl phosphate, trixylenyl phosphate, cresyldiphenyl phosphate, xylenyldiphenyl phosphate and the like.

Typical examples of the condensed phosphoric acid ester shown by the formula (I) are (1) a resorcinolbis(diphenyl) phosphate of the formula:

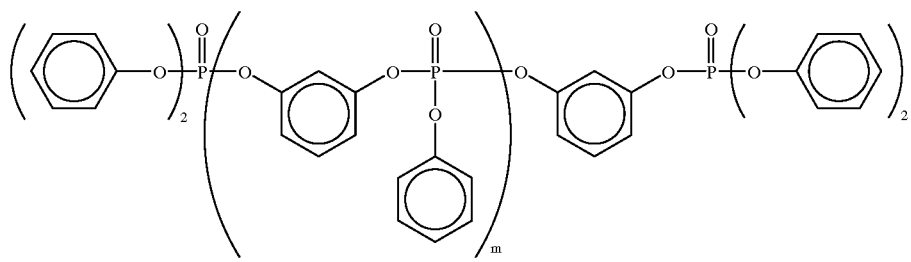

wherein m is from 0 to 15,
(2) a resorcinolbis(di-2,6-xylyl) phosphate of the formula:

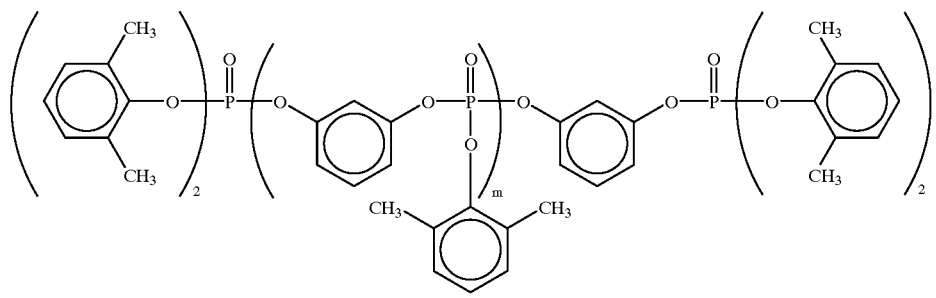

wherein m is from 0 to 15,
(3) a bisphenol A-bis(dicresyl) phosphate of the formula:

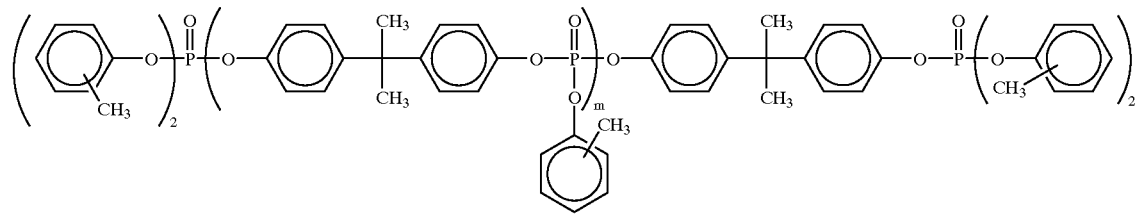

wherein m is from 0 to 15,
(4) a hydroquinonebis(di-2,6-xylyl) phosphate of the formula:

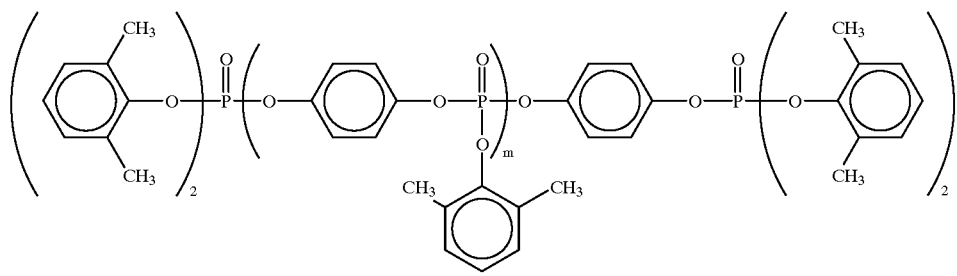

wherein m is from 0 to 15,
and condensation products of these condensed phosphoric acid esters.

The amount of the organic phosphorus based flame retarder (D) is from 0.5 to 30 parts by weight, preferably 1 to 25 parts by weight, more preferably 3 to 20 parts by weight, per 100 parts by weight of the thermoplastic resin (R) composed of the polycarbonate resin (A) and the aromatic polyester resin (B). If the amount of the flame retarder (D) is less than 0.5 part by weight, the flame resistance of the obtained moldings is lower, and if the amount is more than 30 parts by weight, the impact resistance, heat resistance and solvent resistance of the obtained moldings are lowered.

In the present invention, an elastomeric resin (E) may be further incorporated into the resin composition in order to raise the impact strength of the obtained moldings.

As the elastomeric resin (E), those having at least one glass transition temperature within a temperature range below 0° C., especially below −20° C., are preferred in raising the impact strength of the obtained moldings.

Examples of the elastomeric resin (E) are, for instance, diene rubbers such as polybutadiene, styrene-butadiene rubber, acrylonitrile-butadiene rubber and (meth)acrylic acid alkyl ester-butadiene rubber, rubber-like polymers such as acrylic rubber, ethylene-propylene rubber and siloxane rubber, graft copolymers obtained by polymerizing a vinyl monomer in the presence of a diene rubber and/or a rubber-like polymer, various polyolefin resins such as polyethylene and polypropylene, polyolefin resins modified by copolymerization of various comonomers such as ethylene-ethyl acrylate copolymer, polyolefin resins modified with various functional components such as ethylene-glycidyl methacrylate copolymer, and the like, wherein the glass transition temperature of each of them is not more than −20° C. though varies depending on the molecular weight, monomer ratio and the like. The elastomeric resins (E) may be used alone or in admixture thereof.

From the viewpoint of excellent impact strength of the obtained moldings, it is preferable to use, as the elastomeric resin (E), a graft copolymer obtained by polymerizing a monomer component comprising 10 to 90 parts by weight, especially 20 to 70 parts by weight, of at least one vinyl compound selected from the group consisting of aromatic vinyl compounds, vinyl cyanide compounds and alkyl (meth)acrylates, and 0 to 10 parts by weight of other vinyl compounds copolymerizable therewith onto 10 to 90 parts by weight, especially 30 to 80 parts by weight, of the above-mentioned diene rubber and/or rubber-like polymer so that the total of the rubber component and the monomer component is 100 parts by weight. The ratio of the rubber component (diene rubber and/or rubber-like polymer) to the vinyl monomer is from 10/90 to 90/10 by weight, especially from 30/70 to 80/20 by weight. If the proportion of the diene rubber and/or rubber-like polymer is less than 10 parts by weight, the effect of improving the impact strength is small. If the proportion is more than 90 parts by weight, the impact strength-improving effect is not so different from that in the case of using the diene rubber and/or rubber-like polymer themselves, and the compatibility with the thermoplastic resin (R) tends to lower.

Examples of the aromatic vinyl compounds to be copolymerized with the diene rubber and/or rubber-like polymer are, for instance, styrene, o-methylstyrene, m-methylstyrene, p-methylstyrene, α-methylstyrene, vinyltoluene and the like. Examples of the vinyl cyanide compound are, for instance, acrylonitrile, methacrylonitrile and the like. Examples of the alkyl (meth)acrylate are, for instance, butyl acrylate, butyl methacrylate, ethyl acrylate, ethyl methacrylate, methyl acrylate, methyl methacrylate and the like. Examples of the other copolymerizable vinyl compounds are, for instance, an unsaturated acid such as acrylic acid or methacrylic acid, a glycidyl (meth)acrylate such as glyciyl acrylate or glycidyl methacrylate, vinyl acetate, maleic anhydride, N-phenylmaleimide and the like.

Preferable graft copolymers, in points of being excellent in the impact strength-improving effect, are, for instance, a copolymer of butadiene rubber with styrene and methyl methacrylate, a copolymer of butadiene rubber with methyl methacrylate, a copolymer of acrylic rubber with styrene and methyl methacrylate, a copolymer of acrylic rubber with methyl methacrylate, a copolymer of silicone rubber with styrene and methyl methacrylate, a copolymer of silicone rubber with methyl methacrylate, a copolymer of silicone rubber with butyl acrylate, a copolymer of ethylene-propylene rubber with styrene and methyl methacrylate, a copolymer of ethylene-propylene rubber with methyl methacrylate, and the like.

The graft copolymers may be used alone or in admixture thereof.

Also, when a copolymer comprising units of at least one olefin and units of at least one alkyl (meth)acrylate having a $C_1$ to $C_{10}$ alkyl group is used as the elastomeric resin (E), chemical resistance, rib strength and the like of the obtained moldings are further improved in addition to the impact resistance.

This copolymer is obtained generally by a radical polymerization of at least one olefin and at least one alkyl (meth)acrylate in the presence of a radical polymerization initiator. However, the polymerization method thereof is not limited to this method, but the polymerization can be carried out according to generally known various polymerization methods. The copolymer may be in any form of random copolymer, block copolymer, graft copolymer and the like.

Examples of the olefin in the above-mentioned copolymer are, for instance, ethylene, propylene, 1-butene, 1-pentene, and the like. The olefins may be used alone or in admixture thereof. Ethylene is particularly preferred as the olefin, since the chemical resistance is improved to a higher level.

Also, as the alkyl (meth)acrylate in the above-mentioned copolymer, those having an alkyl group with 1 to 10 carbon atoms, preferably at most 8 carbon atoms, more preferably at most 6 carbon atoms, are used. If the number of carbon atoms in the alkyl group is more than 10, the compatibility with the thermoplastic resin (R) is lowered to cause dispersion fault in resin compositions, thus resuling in lowering of mechanical strength.

Examples of the alkyl (meth)acrylate are, for instance, methyl acrylate, ethyl acrylate, n-propyl acrylate, isopropyl acrylate, n-butyl acrylate, t-butyl acrylate, methyl methacrylate, ethyl methacrylate, n-propyl methacrylate, isopropyl methacrylate, n-butyl methacrylate, t-butyl methacrylate, and the like. These may be used alone or in admixture thereof. Methyl acrylate, ethyl acrylate, methyl methacrylate and ethyl methacrylate are particularly preferred from the viewpoint of excellent mechanical strength.

The melt index (MI) of the olefin-alkyl (meth)acrylate copolymer measured at 190° C. under 2 kg loading (according to JIS K 6730) is preferably from 0.1 to 500 g/10 minutes, more preferably from 0.3 to 400 g/10 minutes, further preferably from 0.5 to 300 g/10 minutes. If the MI value is less than 0.1 g/10 minutes, the fluidity of the obtained composition tends to lower, and if the MI value is more than 500 g/10 minutes, the mechanical strength of the obtained moldings tends to lower.

The content of the olefin units in the copolymer is preferably from 40 to 95% by weight, more preferably from 45 to 90% by weight, further preferably from 50 to 85% by weight. The content of the alkyl (meth)acrylate units in the copolymer is preferably from 5 to 60% by weight, more preferably from 10 to 55% by weight, further preferably from 15 to 50% by weight. If the content of the alkyl (meth)acrylate units is less than 5% by weight, the effect of improving the chemical resistance is small, and if the content is more than 60% by weight, the heat stability at the time of melting, e.g. in molding processing, tends to lower.

The olefin-(meth)acrylate copolymers may be used alone or in admixture of those having different monomer components or MI values.

In case of adding the elastomeric resin (E) to resin compositions, it is preferable that the amount of the elstomeric resin (E) is at most 15 parts by weight, especially from 0.1 to 12 parts by weight, more especially from 0.2 to 10 parts by weight, per 100 parts by weight of the thermoplastic resin (R). If the amount is more than 15 parts by weight, the rigidity and heat resistance are lowered. Also, it is preferable to use the elastomeric resin (E) in an amount of at least 0.1 part by weight for obtaining a clear effect produced thereby.

The flame retarded resin composition of the present invention may contain (F) an epoxy compound having substantially no halogen atom in its molecule for the purpose of raising the solvent resistance of the composition and the heat stability at melting and for the purpose of preventing discoloration of the composition.

The epoxy compound (F) used in the present invention is a compound which have at least one epoxy group in the molecule and substantially do not have any halogen atom in the molecule. Preferably, epoxy compounds having an epoxy equivalent of 50 to 3,000, especially 80 to 1,000, are used. There is a case where the epoxy compounds (F) contain a trace amount of chlorine atom or bromine atom as an impurity introduced at the time of the production depending on methods for the production, but epoxy compounds containing a trace amount of a halogen atom as such an impurity are regarded herein as the compound having substantially no halogen atom.

Examples of the epoxy compound (F) are, for instance, an N-glycidylimide compound such as N-glycidylphthalimide or N-glycidyltetrahydrophthalimide, a phenyl glycidyl ether compound such as phenyl glycidyl ether or p-butylphenyl glycidyl ether, neohexene oxide, a (poly)alkylene glycol diglycidyl ether compound such as ethylene glycol diglycidyl ether, polyethylene glycol diglycidyl ether, propylene glycol diglycidyl ether, polypropylene glycol diglycidyl ether, tetramethylene glycol diglycidyl ether or polytetramethylene glycol diglycidyl ether, a glycidyl ester compound such as bisphenol A epoxy compound, bisphenol S epoxy compound, resorcinol epoxy compound, phenol novolac epoxy compound, o-cresol novolac epoxy compound, diglycidyl adipate, diglycidyl sebacate or diglycidyl phthalate, glycidyl methacrylate, glycidyl acrylate, ethylene-glycidyl methacrylate copolymer, ethylene-glycidyl methacrylate-vinyl acetate copolymer, ethylene-glycidyl methacrylate-methyl acrylate copolymer, ethylene-glycidyl methacrylate-ethyl acrylate copolymer, and the like. Among them, bisphenol A epoxy compounds, novolac type epoxy comounds and epoxy group-containing olefin copolymers are preferred from the viewpoint of heat stability of the obtained composition. The epoxy compounds may be used alone or in admixture thereof.

If an epoxy compound containing a halogen atom in its molecule such as tetrabromobisphenol A epoxy compound is incorporated as the epoxy compound, the feature of the present invention of being a flame retarded thermoplastic resin composition containing no halogen atom is lost. For this reason, the epoxy compounds to be incorporated should contain no halogen atom in the molecule.

In case of incorporating the epoxy compound (F) into resin compositions, the amount of the epoxy compound (F) is at most 10 parts by weight, preferably from 0.01 to 8 parts by weight, more preferably from 0.05 to 5 parts by weight, per 100 parts by weight of the thermoplastic resin (R). If the amount is more than 10 parts by weight, the fluidity is lowered and, in addition, there is a case where the heat resistance and impact resistance are lowered. Also, it is preferable to use the epoxy compound (F) in an amount of at least 0.01 part by weight for obtaining a clear effect produced thereby.

In the present invention, reinforcing fillers other than the silicate compound (C) can be used in order to further raise the heat resistance and mechanical strength of the resin compositions. Examples of inorganic reinforcing fillers are, for instance, a fibrous reinforcing agent such as glass fiber, carbon fiber or metallic fiber, calcium carbonate, glass beads, glass powder, ceramic powder, metallic powder, carbon black and the like. The reinforcing fillers may be surface-treated with a surface treating agent in order to raise the adhesion to the thermoplastic resin (R). Silane coupling agents having an epoxy group such as an epoxysilane are preferable as the surface treating agent, since they do not deteriorate the physical properties of the thermoplastic resin (R). The method for the surface treatment is not particularly limited, and usual surface treating methods are adoptable.

The inorganic reinforcing fillers may be used alone or in admixture of those different in kind, particle diameter and length, surface treating method and the like.

The amount of the inorganic reinforcing filler is at most 100 parts by weight, preferably at most 50 parts by weight, more preferably at most 10 parts by weight, per 100 parts by weight of the thermoplastic resin (R). If the amount is more than 100 parts by weight, the impact resistance is lowered and, in addition, there is a case where the molding processability and flame resistance are lowered. Also, since the surface property and dimensional property of molded products tend to be deteriorated as the amount of the inorganic reinforcing filler increases, it is preferable to decrease the amount of the inorganic reinforcing filler as small as possible in the case where these properties are important. It is preferable to use the inorganic reinforcing filler in an amount of at least about 0.1 part by weight for obtaining effects produced by the use thereof.

Any other thermoplastic or thermosetting resins, e.g., liquid crystalline polyester resins, polyamide resins, polystyrene resins, polyphenylene sulfide resins, polyphenylene ether resins, polyacetal resins and polysulfone resins, may be incorporated into the compositions of the present invention, so long as the objects of the present invention are not impaired. These may be used alone or in admixture thereof.

Also, in order to further raise the performances of the compositions of the present invention, one or more of antioxidants such as phenol antioxidants or thioether antioxidants and heat stabilizers such as phosphorus stabilizers may be used. Further, one or more of usual additives may be used, as occasion demands, e.g., stabilizer, lubricant, releasing agent, plasticizer, flame retarders other than phosphorus based flame retarders, assistant for flame retardation, ultraviolet absorber, light stabilizer, pigment, dye, antistatic agent, conductivity-imparting agent, dispersing agent, compatibilizer, antibacterial agent and the like.

The method for preparing the compositions of the present invention is not particularly limited and, for instance, the compositions can be prepared by such a method that after drying the above-mentioned components and other additives and resins, they are melt-kneaded by a melt-kneader such as a single screw extruder or twin screw extruder. Also, in case that materials to be incorporated are liquid, they can be added to a melt-kneader in the middle by using a liquid feed pump or the like.

The method of the molding processing of the compositions of the present invention is not particularly limited, and generally used molding methods are adoptable, e.g., injection molding, blow molding, extrusion, vacuum molding, press molding and calendering.

The compositions of the present invention are more specifically explained by means of examples, but it is to be understood that the present invention is not limited thereto.

In the following explanation, all parts are by weight unless otherwise noted.

The ingredients used in Examples and Comparative Examples are shown below.

Polycarbonate Resin (A)

PC-1: Bisphenol A polycarbonate resin having a viscosity average molecular weight of about 28,800

PC-2: Bisphenol A polycarbonate resin having a viscosity average molecular weight of about 23,500

PC-3: Bisphenol A polycarbonate resin having a viscosity average molecular weight of about 25,000

Aromatic Polyester Resin (B)

PET-1: Linear polyethylene terephthalate resin having an intrinsic viscosity of 0.75

PET-2: Linear polyethylene terephthalate resin having an intrinsic viscosity of 0.65

PET-3: Linear polyethylene terephthalate resin having an intrinsic viscosity of 0.60

PBT-1: Linear polybutylene terephthalate resin having an intrinsic viscosity of 0.75

PBT-2: Linear polybutylene terephthalate resin having an intrinsic viscosity of 0.85

Silicate Compound (C)

MIC-1: Muscovite type mica having a weight average flake size of 8 m$\mu$ and a bulk density of 6.2 g/cm$^3$ MIC-2: Muscovite type mica having a weight average flake size of 30 $\mu$m and a bulk density of 4.3 g/cm$^3$ TAL-1: Talc having a weight average particle size of 3.2 $\mu$m and a bulk specific volume of 1.6 ml/g TAL-2: Talc having a weight average particle size of 1.8 $\mu$m and a bulk specific volume of 2.2 ml/g KAO1: Kaolin (trade mark: SATINTON No.5, product of ENGELHARD Corp.)

Organic Phosphorus Based Flame Retarder (D)

P-1: Bisphenol A-bis(dicresyl) phosphate

P-2: Triphenyl phosphate

P-3: Hydroquinonebis(di-2,6-xylyl) phosphate

P-4: Resorcinolbis(di-2,6-xylyl) phosphate

P-5: Resorcinolbis(diphenyl) phosphate

Elastomeric Resin (E)

MB: Copolymer of butadiene and methyl methacrylate, Tg below –20° C. (registered trade mark: PARALOID EXL-2602, product of Kureha Chemical Industry Co., Ltd.)

LLDPE: Linear low density polyethylene, Tg below –20° C. (registered trade mark: Idemitsu Polyethylene-L 0134N, product of Idemitsu Sekiyu Kagaku Kogyo Kabushiki Kaisha)

EEA-1: Ethylene-ethyl acrylate copolymer having an MI of 25 g/10 minutes and an ethyl acrylate content of 35% by weight EEA-2: Ethylene-ethyl acrylate copolymer having an MI of 20 g/10 minutes and an ethyl acrylate content of 25% by weight EEA-3: Ethylene-ethyl acrylate copolymer having an MI of 275 g/10 minutes and an ethyl acrylate content of 25% by weight EEA-4: Ethylene-ethyl acrylate copolymer having an MI of 25 g/10 minutes and an ethyl acrylate content of 17% by weight Epoxy Compound (F)

EP-1: o-Cresol novolac type epoxy compound having an epoxy equivalent of about 210 (registered trade mark: YDCN-704P, product of Toto Kasei Kabushiki Kaisha)

EP-2: Epoxy compound having an epoxy equivalent of about 200 (registered trade mark: Adekastab EP-22, product of Asahi Denka Kogyo K.K.)

EP-3: Bisphenol A type epoxy resin having an epoxy equivalent of about 185 (registered trade mark: Epikote 828, product of Yuka Shell Epoxy Kabushiki Kaisha)

Other Additives

AO-60: High molecular weight hindered phenol (stabilizer) (registered trade mark: Adekastab AO-60, product of Asahi Denka Kogyo K.K.)

PEP-36: Powdery phosphite stabilizer (registered trade mark: Adekastab PEP-36, product of Asahi Denka Kogyo K.K.)

HP-10: Powdery phosphite stabilizer (registered trade mark: Adekastab HP-10, product of Asahi Denka Kogyo K.K.)

GF-1: Glass fiber (registered trade mark: T-195H/P, product of Nippon Electric Glass Co., Ltd.)

PTFE: Polytetrafluoroethylene resin (registered trade mark: Polyflon FA-500, product of Daikin Industries, Ltd.)

Physical properties in the Examples and Comparative Examples were evaluated by the following methods.

Flame Resistance

After drying obtained pellets at 110° C. for 5 hours, test specimens having a size of 125 mm×13 mm and a thickness of 1/16 inch were prepared from the pellets by a 35 t injection molding machine at a cylinder temperature of 280° C. and a mold temperature of 70° C. Using the obtained test specimens, the flame resistance of 1/16 inch bar was measured according to UL-94 V standards.

Dripping Property

A flammability test using 1/32 inch bar was made according to UL-94 V standards, and it was evaluated whether ignition of cotton owing to dripping occurred or not.

Mechanical Strength

After drying obtained pellets at 110° C. for 5 hours, ASTM No. 1 test specimens were prepared from the pellets by a 75 t injection molding machine at a cylinder temperature of 280° C. and a mold temperature of 70° C. Using the obtained test specimens, the maximum value of tensile strength (unit: MPa) was measured according to ASTM D 638 at 23° C. and a rate of tension of 5 mm/minute.

Heat Resistance (low load)

After drying obtained pellets at 110° C. for 5 hours, test specimens having a size of 125 mm×13 mm and a thickness of ¼ inch were prepared from the pellets by a 75 t injection molding machine at a cylinder temperature of 280° C. and a mold temperature of 70° C. Using the obtained test specimens, HDT (unit: ° C.) was measured according to ASTM D 648 under conditions of ¼ inch in thickness and 0.45 MPa in load.

Heat Resistance (high load)

After drying obtained pellets at 110° C. for 5 hours, test specimens having a size of 125 mm×13 mm and a thickness of ¼ inch were prepared from the pellets by a 75 t injection molding machine at a cylinder temperature of 280° C. and a mold temperature of 70° C. Using the obtained test specimens, HDT (unit: ° C.) was measured according to ASTM D 648 under conditions of ¼ inch in thickness and 1.82 MPa in load.

Salad Oil Resistance

After drying obtained pellets at 110° C. for 5 hours, ASTM No. 1 test specimens were prepared from the pellets by a 75 t injection molding machine at a cylinder temperature of 280° C. and a mold temperature of 70° C. A 1.5% flexural strain was applied to the obtained dumb-bell test specimens. In an oven kept at 80° C., the test specimens were coated with a salad oil, and after 24 hours, generation of cracks was observed and evaluation was made according to the following criteria.

⊚: No craking is observed.

○: Generation of small cracks having a length of less than 1 mm is observed.

Δ: Generation of large cracks having a length of not less than 1 mm is observed.

X: Breaking of specimen is observed.

Gasoline Resistance

After drying obtained pellets at 110° C. for 5 hours, ASTM No. 1 test specimens were prepared from the pellets by a 75 t injection molding machine at a cylinder temperature of 280° C. and a mold temperature of 70° C. A 1% flexural strain was applied to the obtained dumb-bell test specimens, and a gasoline (regular gasoline made by Nippon Oil Company, Ltd.) was applied to the test specimens. After allowing to stand at 23° C. for 48 hours, change in surface appearance of the specimens was visually observed and evaluation was made according to the following criteria.

○: No change in appearance.

Δ: Generation of cracks of less than 3 mm.

X: Generation of cracks of not less than 3 mm.

Oil Resistance (operating oil)

After drying obtained pellets at 110° C. for 5 hours, ASTM No. 1 test specimens were prepared from the pellets by a 75 t injection molding machine at a cylinder temperature of 280° C. and a mold temperature of 70° C. A 1% flexural strain was applied to the obtained dumb-bell test specimens. An operating oil was applied onto the test specimens, and after allowing to stand for 72 hours in an oven kept at 80° C., change in surface appearance of the specimens was visually observed and evaluation was made according to the following criteria ○: No change in appearance.

Δ: Generation of cracks of less than 3 mm.

X: Generation of cracks of not less than 3 mInL

Chemical Resistance (dioctyl phthalate)

After drying obtained pellets at 110° C. for 5 hours, ASTM No. 1 test specimens were prepared from the pellets by a 75 t injection molding machine at a cylinder temperature of 280° C. and a mold temperature of 70° C. A 1% flexural strain was applied to the obtained dumb-bell test specimens. Dioctyl phthalate (reagent) was applied onto the test specimens, and after allowing to stand for 24 hours in an oven kept at 80° C., change in surface appearance of the specimens was visually observed and evaluation was made according to the following criteria ○: No change in appearance.

Δ: Generation of cracks of less than 3 mm.

X: Generation of cracks of not less than 3 mm.

Surface Property of Moldings

After drying obtained pellets at 110° C. for 5 hours, plates having a size of 10 cm×10 cm and a thickness of 1 mm were prepared from the pellets by a 75 t injection molding machine at a cylinder temperature of 280° C. and a mold temperature of 70° C. The surface property of the obtained plates was visually evaluated according to the following criteria.

⊚: No haze or the like is observed in the whole surface of the plate, so the surface property is good.

○: Haze is observed very slightly in the surface of the plate, but the surface property is almost good.

Δ: Haze is observed in a part of the plate surface.

X: Haze is observed in almost all parts of the plate surface or in the whole surface.

Dimensional Stability of Moldings

After drying obtained pellets at 110° C. for 5 hours, a plate having a size of 10 cm×10 cm and a thickness of 1 mm was prepared from the pellets by a 75 t injection molding machine at a cylinder temperature of 280° C. and a mold temperature of 70° C., and allowed to stand for a week under the conditions of 23° C. and 50% RH. Thereafter, the plate was placed on a smooth plane, any one of four corners of the plate was pressed onto the smooth plane, and a spacing between the plane and the other corner located on the diagonal line with respect to the pressed corner was measured by a clearance gage. The maximum spacing of the values for the four corners was evaluated according to the following criteria.

⊚: Spacing of less than 0.5 mm

○: Spacing between not less than 0.5 mm and less than 1mm

Δ: Spacing between not less than 1 mm and less than 3 mm

X: Spacing of not less than 3 mm

Impact Strength

After drying obtained pellets at 110° C. for 5 hours, test specimens were prepared from the pellets by a 75 t injection molding machine at a cylinder temperature of 280° C. and a mold temperature of 70° C. Using the obtained specimens, Izod impact strength (23° C., ¼ inch thickness, non-notched) (unit: J/m) was measured according to ASTM D 256.

Heat Stability

After drying obtained pellets at 110° C. for 5 hours, the pellets were added to a 75 t injection molding machine, were made to stay therein for 10 minutes at a cylinder temperature of 280° C. and were formed into a plate having a size of 120 mm×120 mm×2 mm at a mold temperature of 70° C. The surface appearance of the obtained molded article was visually evaluated according to the following criteria.

⊚: Good appearance

○: Slight yellowing

Δ: Yellowing and appearance defect such as flash, silver streak or surface fault owing to a gas being observed X: Marked yellowing and marked appearance defect such as flash, silver streak or surface fault owing to a gas being observed

EXAMPLE 1

There were thoroughly mixed 85 parts of a bisphenol A type polycarbonate resin (PC-1) dried at 120° C. for 4 hours as the polycarbonate resin (A), 15 parts of a linear polyethylene terephthalate resin (PET-1) dried at 140° C. for 4 hours as the aromatic polyester resin (B), 0.2 part of a phenol antioxidant (AO-60) and 0.5 part of a phosphorus stabilizer (PEP-36), and the resulting mixture was fed to a hopper of a same-direction rotating twin-screw extruder (TEX44XCT-38 made by The Japan Steel Works, Ltd.) set at 280° C. Further, 6 parts of bisphenol A bis(dicresylphosphate) (P-1) was added as the organic phosphorus flame retarder (D) to the extruder from a liquid feed pump thereof, and 16 parts of a mica (MIC-1) was added as the silicate compound (C) to the extruder from a side feeder thereof. They were melt-kneaded and pelletized to give a composition. The results of evaluation of the obtained composition are shown in Table 1.

EXAMPLES 2 TO 47 AND COMPARATIVE EXAMPLES 1 TO 15

According to the recipes shown in Tables 1 to 8, compositions were prepared and evaluated in the same manner as in Example 1. The results are shown in Tables 1 to 8.

In these Examples, drying of PBT-1 and PBT-2 was conducted at 130° C. for 4 hours. Also, organic phosphorus flame retarders P-3, P-4 and P-5 and epoxy compounds EP-2 and EP-3 were fed from the liquid feed pump of the extruder, and silicate compounds MIC-2, TAL-1, TAL-2 and KAO-1 and glass fiber GF-1 were fed from the side feeder of the extruder, and the other ingredients were fed from the hopper of the extruder.

TABLE 1

| Example No. | | 1 | 2 | 3 | 4 | 5 | 6 | 7 | 8 | 9 | 10 |
|---|---|---|---|---|---|---|---|---|---|---|---|
| Ingredients (part) | | | | | | | | | | | |
| Polycarbonate resin (A) | PC-1 | 85 | 75 | 85 | 85 | 85 | 85 | 70 | 85 | 85 | 85 |
| Aromatic polyester resin (B) | PET-1 | 15 | 25 | 15 | 15 | 15 | 15 | 30 | 15 | 15 | 15 |
| Silicate compound (C) | MIC-1 | 16 | 16 | 16 | 16 | 16 | 16 | 16 | 16 | 16 | 16 |
| Organic phosphorus flame retarder (D) | P-1 | 6 | 6 | 6 | 6 | 6 | 6 | — | — | — | — |
| | P-2 | — | — | — | — | — | — | 6 | — | — | — |
| | P-3 | — | — | — | — | — | — | — | 6 | 12 | — |
| | P-4 | — | — | — | — | — | — | — | — | — | 6 |
| Elastomeric resin (E) | MB | — | — | 5 | — | — | — | — | — | — | — |
| | LLDPE | — | — | — | 2 | — | — | — | — | — | — |
| Epoxy compound (F) | EP-1 | — | — | — | — | 0.5 | — | — | — | — | — |
| | EP-2 | — | — | — | — | — | 0.5 | 0.2 | 0.5 | 0.5 | 0.5 |
| Others | AO-60 | 0.2 | 0.2 | 0.2 | 0.2 | 0.2 | 0.2 | 0.2 | 0.2 | 0.2 | 0.2 |
| | PEP-36 | 0.5 | 0.5 | 0.5 | 0.5 | 0.5 | 0.5 | 0.3 | 0.5 | 0.5 | 0.5 |
| Evaluation Results | | | | | | | | | | | |
| Flame resistance | | V-0 | V-0 | V-0 | V-0 | V-0 | V-0 | V-0 | V-0 | V-0 | V-0 |
| Salad oil resistance | | ○ | ○ | ○ | ◉ | ◉ | ◉ | ◉ | ◉ | ◉ | ◉ |
| Heat resistance (low load)(° C.) | | 112 | 108 | 105 | 107 | 116 | 114 | 110 | 119 | 110 | 117 |
| Tensile strength (MPa) | | 74 | 72 | 78 | 76 | 78 | 77 | 71 | 75 | 72 | 76 |
| Impact strength (J/m) | | 780 | 710 | 980 | 950 | — | — | — | — | — | — |
| Surface property | | ◉ | ◉ | ◉ | ◉ | ◉ | ◉ | ◉ | ◉ | ◉ | ◉ |
| Dimensional stability | | ◉ | ◉ | ◉ | ◉ | ◉ | ◉ | ◉ | ◉ | ◉ | ◉ |

TABLE 2

| Example No. | | 11 | 12 | 13 | 14 | 15 | 16 | 17 |
|---|---|---|---|---|---|---|---|---|
| Ingredients (part) | | | | | | | | |
| Polycarbonate resin (A) | PC-1 | 85 | 85 | 85 | — | 90 | 85 | 60 |
| | PC-2 | — | — | — | 90 | — | — | — |
| Aromatic polyester resin (B) | PET-1 | 15 | 15 | 15 | — | — | 15 | 40 |
| | PET-2 | — | — | — | 10 | — | — | — |
| | PBT-1 | — | — | — | — | 10 | — | — |
| Silicate compound (C) | MIC-1 | — | 8 | 25 | 16 | 25 | 16 | 25 |
| | MIC-2 | 16 | — | — | — | — | — | — |
| Organic phosphorus flame retarder (D) | P-1 | 6 | 6 | 6 | 6 | — | 6 | — |
| | P-3 | — | — | — | — | 6 | — | 6 |
| Epoxy compound (F) | EP-2 | 0.5 | 0.5 | 0.5 | 0.5 | 0.5 | 0.5 | 0.5 |
| Others | AO-60 | 0.2 | 0.2 | 0.2 | 0.2 | 0.2 | 0.2 | 0.2 |
| | PEP-36 | 0.5 | 0.5 | 0.5 | 0.5 | 0.5 | 0.5 | 0.5 |
| | GF-1 | — | 8 | — | — | — | — | 10 |
| | PTFE | — | — | — | — | — | 0.5 | — |
| Evaluation Results | | | | | | | | |
| Flame resistance | | V-0 | V-0 | V-0 | V-0 | V-0 | V-0 | V-0 |
| Salad oil resistance | | ◉ | ◉ | ◉ | ◉ | ◉ | ◉ | ◉ |
| Heat resistance (low load)(° C.) | | 117 | 120 | 121 | 118 | 103 | 114 | 101 |
| Tensile strength (MPa) | | 78 | 89 | 81 | 79 | 75 | 77 | 69 |
| Surface property | | ◉ | ○ | ◉ | ◉ | ◉ | ○ | ○ |
| Dimensional stability | | ◉ | ○ | ◉ | ◉ | ◉ | ◉ | ○ |

TABLE 3

| Example No. | | 18 | 19 | 20 | 21 | 22 | 23 | 24 | 25 | 26 | 27 |
|---|---|---|---|---|---|---|---|---|---|---|---|
| Ingredients (part) | | | | | | | | | | | |
| Polycarbonate resin (A) | PC-3 | 85 | 75 | 85 | 85 | 85 | 85 | 70 | 85 | 85 | 85 |
| Aromatic polyester resin (B) | PET-1 | 15 | 25 | 15 | 15 | 15 | 15 | 30 | 15 | 15 | 15 |
| Silicate compound (C) | TAL-1 | 16 | 16 | 16 | 16 | 16 | 16 | 16 | 16 | 16 | 16 |
| Organic phosphorus flame retarder (D) | P-1 | 6 | 6 | 6 | 6 | 6 | 6 | — | — | — | — |
| | P-2 | — | — | — | — | — | — | 6 | — | — | — |
| | P-3 | — | — | — | — | — | — | — | 6 | 12 | — |
| | P-4 | — | — | — | — | — | — | — | — | — | 6 |
| Elastomeric resin (E) | MB | — | — | 5 | — | — | — | — | — | — | — |
| | LLDPE | — | — | — | 2 | — | — | — | — | — | — |
| Epoxy compound (F) | EP-1 | — | — | — | — | 0.5 | — | — | — | — | — |
| | EP-2 | — | — | — | — | — | 0.5 | 0.2 | 0.5 | 0.5 | 0.5 |
| Others | AO-60 | 0.2 | 0.2 | 0.2 | 0.2 | 0.2 | 0.2 | 0.2 | 0.2 | 0.2 | 0.2 |
| | HP-10 | 0.3 | 0.3 | 0.3 | 0.3 | 0.3 | 0.3 | 0.3 | 0.3 | 0.3 | 0.3 |
| Evaluation Results | | | | | | | | | | | |
| Flame resistance | | V-0 | V-0 | V-0 | V-0 | V-0 | V-0 | V-0 | V-0 | V-0 | V-0 |
| Salad oil resistance | | ○ | ○ | ○ | ◎ | ◎ | ◎ | ◎ | ◎ | ◎ | ◎ |
| Heat resistance (low load)(° C.) | | 120 | 116 | 113 | 115 | 124 | 122 | 111 | 125 | 119 | 125 |
| Tensile strength (MPa) | | 82 | 80 | 84 | 82 | 83 | 84 | 80 | 81 | 79 | 81 |
| Surface property | | ◎ | ◎ | ◎ | ◎ | ◎ | ◎ | ◎ | ◎ | ◎ | ◎ |
| Dimensional stability | | ◎ | ◎ | ◎ | ◎ | ◎ | ◎ | ◎ | ◎ | ◎ | ◎ |

TABLE 4

| Example No. | | 28 | 29 | 30 | 31 | 32 | 33 | 34 |
|---|---|---|---|---|---|---|---|---|
| Ingredients (part) | | | | | | | | |
| Polycarbonate resin (A) | PC-3 | 85 | 85 | 85 | 90 | 90 | 85 | 60 |
| | PC-2 | — | — | — | 90 | — | — | — |
| Aromatic polyester resin (B) | PET-1 | 15 | 15 | 15 | — | — | 15 | 40 |
| | PET-2 | — | — | — | 10 | — | — | — |
| | PBT-1 | — | — | — | — | 10 | — | — |
| Silicate compound (C) | MIC-1 | — | 6 | — | — | — | — | — |
| | TAL-1 | — | 6 | 25 | 16 | 25 | 16 | 25 |
| | TAL-2 | 16 | — | — | — | — | — | — |
| Organic phosphorus flame retarder (D) | P-1 | 6 | 6 | 6 | 6 | — | 6 | — |
| | P-3 | — | — | — | — | 6 | — | 6 |
| Epoxy compound (F) | EP-2 | 0.5 | 0.5 | 0.5 | 0.5 | 0.5 | 0.5 | 0.5 |
| Others | AO-60 | 0.2 | 0.2 | 0.2 | 0.2 | 0.2 | 0.2 | 0.2 |
| | HP-10 | 0.3 | 0.3 | 0.3 | 0.3 | 0.3 | 0.3 | 0.3 |
| | GF-1 | — | 6 | — | — | — | — | 5 |
| | PTFE | — | — | — | — | — | 0.2 | — |
| Evaluation Results | | | | | | | | |
| Flame resistance | | V-0 | V-0 | V-0 | V-0 | V-0 | V-0 | V-0 |
| Salad oil resistance | | ◎ | ◎ | ◎ | ◎ | ◎ | ◎ | ◎ |
| Heat resistance (high load)(° C.) | | 125 | 129 | 128 | 127 | 113 | 123 | 113 |
| Tensile strength (MPa) | | 87 | 92 | 86 | 85 | 82 | 81 | 75 |
| Surface property | | ◎ | ○ | ◎ | ◎ | ◎ | ○ | ○ |
| Dimensional stability | | ◎ | ○ | ◎ | ◎ | ◎ | ◎ | ○ |

TABLE 5

| Example No. | | 35 | 36 | 37 | 38 | 39 | 40 | 41 |
|---|---|---|---|---|---|---|---|---|
| Ingredients (part) | | | | | | | | |
| Polycarbonate resin (A) | PC-2 | 85 | 85 | 90 | 90 | — | 85 | 80 |
| | PC-3 | — | — | — | — | 65 | — | — |
| Aromatic polyester resin (B) | PET-1 | 15 | 15 | — | 10 | — | 15 | — |
| | PET-3 | — | — | 10 | — | 35 | — | — |
| | PBT-2 | — | — | — | — | — | — | 20 |

TABLE 5-continued

| Example No. | | 35 | 36 | 37 | 38 | 39 | 40 | 41 |
|---|---|---|---|---|---|---|---|---|
| Silicate compound (C) | MIC-1 | 16 | — | — | — | 20 | 20 | — |
| | MIC-2 | — | 16 | — | — | — | — | — |
| | TAL-1 | — | — | 24 | — | — | — | 20 |
| | KAO-1 | — | — | — | 24 | — | — | — |
| Organic phosphorus flame retarder (D) | P-1 | 7 | 7 | — | — | — | 7 | 7 |
| | P-3 | — | — | — | 7 | — | — | — |
| | P-4 | — | — | 12 | — | — | — | — |
| | P-5 | — | — | — | — | 7 | — | — |
| Elastomeric resin (E) | EEA-1 | 5 | 5 | 5 | 10 | — | — | — |
| | EEA-2 | — | — | — | — | 7 | — | — |
| | EEA-3 | — | — | — | — | — | 7 | — |
| | EEA-4 | — | — | — | — | — | — | 8 |
| Others | AO-60 | 0.2 | 0.2 | 0.2 | 0.2 | 0.2 | 0.2 | 0.2 |
| | HP-10 | 0.3 | 0.3 | 0.3 | 0.3 | 0.3 | 0.3 | 0.3 |
| Evaluation Results | | | | | | | | |
| Flame resistance | | V-0 | V-0 | V-0 | V-0 | V-0 | V-0 | V-0 |
| Gasoline resistance | | ○ | ○ | ○ | ○ | ○ | ○ | ○ |
| Oil resistance | | ○ | ○ | ○ | ○ | ○ | ○ | ○ |
| Chemical resistance | | ○ | ○ | ○ | ○ | ○ | ○ | ○ |

TABLE 6

| Example No. | | 42 | 43 | 44 | 45 | 46 | 47 |
|---|---|---|---|---|---|---|---|
| Ingredients (part) | | | | | | | |
| Polycarbonate resin (A) | PC-2 | 85 | 85 | 85 | 85 | 85 | 85 |
| Aromatic polyester resin (B) | PET-1 | 15 | 15 | 15 | 15 | 15 | 15 |
| Silicate compound (C) | MIC-1 | 16 | 12 | 10 | 16 | 16 | 16 |
| Organic phosphorus flame retarder (D) | P-1 | 7 | 7 | — | 7 | 7 | 7 |
| | P-4 | — | — | 7 | — | — | — |
| Elastomeric resin (E) | EEA-1 | 5 | 5 | 7 | 5 | 5 | 5 |
| Epoxy compound (F) | EP-1 | — | — | — | — | — | 1.2 |
| | EP-2 | — | — | — | — | 0.4 | — |
| | EP-3 | — | — | — | 0.6 | — | — |
| Others | AO-60 | 0.2 | 0.2 | 0.2 | 0.2 | 0.2 | 0.2 |
| | HP-10 | 0.3 | 0.3 | 0.3 | 0.3 | 0.3 | 0.3 |
| | PTFE | 0.5 | — | — | — | 0.6 | — |
| | GF-1 | — | 4 | 10 | — | — | — |
| Evaluation Results | | | | | | | |
| Flame resistance (1/16" bar) | | V-0 | V-0 | V-0 | V-0 | V-0 | V-0 |
| Dripping (1/32" bar) | | None | — | — | — | — | — |
| Gasoline resistance | | ○ | ○ | ○ | ○ | ○ | ○ |
| Oil resistance | | ○ | ○ | ○ | ○ | ○ | ○ |
| Chemical resistance | | ○ | ○ | ○ | ○ | ○ | ○ |
| Heat resistance (high load)(° C.) | | — | 109 | 113 | — | — | — |
| Heat stability | | — | — | — | ○ | ○ | ○ |

TABLE 7

| Comparative Example No. | | 1 | 2 | 3 | 4 | 5 | 6 | 7 | 8 | 9 | 10 |
|---|---|---|---|---|---|---|---|---|---|---|---|
| Ingredients (part) | | | | | | | | | | | |
| Polycarbonate resin (A) | PC-1 | 100 | 100 | 40 | 40 | 85 | 85 | 85 | 85 | 85 | 85 |
| Aromatic polyester resin (B) | PET-1 | — | — | 60 | 60 | 15 | 15 | 15 | 15 | 15 | 15 |
| Silicate compound (C) | MIC-1 | 16 | — | 16 | — | — | — | — | 16 | 200 | 16 |
| | TAL-1 | — | 16 | — | 16 | — | — | — | — | — | — |
| Organic phosphorus flame retarder (D) | P-1 | 6 | 6 | 6 | 6 | 6 | 6 | 6 | — | 6 | 60 |
| Others | AO-60 | 0.2 | 0.2 | 0.2 | 0.2 | 0.2 | 0.2 | 0.2 | 0.2 | 0.2 | 0.2 |
| | PEP-36 | 0.5 | — | 0.5 | — | 0.5 | 0.5 | 0.5 | 0.5 | 0.5 | 0.5 |
| | HP-10 | — | 0.3 | — | 0.3 | — | — | — | — | — | — |
| | GF-1 | — | — | — | — | — | — | 16 | — | — | — |
| | PTFE | — | — | — | — | — | 1.5 | — | — | — | — |

TABLE 7-continued

| Comparative Example No. | 1 | 2 | 3 | 4 | 5 | 6 | 7 | 8 | 9 | 10 |
|---|---|---|---|---|---|---|---|---|---|---|
| Evaluation Results | | | | | | | | | | |
| Flame resistance | V-0 | V-0 | V-0 | V-0 | V-2 | V-0 | V-1 | notV[*1] | *2 | *2 |
| Salad oil resistance | X | X | ◎ | ◎ | ○ | ○ | ○ | ○ | | |
| Heat resistance (low load)(° C.) | 130 | 135 | 85 | 90 | 106 | 106 | 120 | 135 | | |
| Tensile strength (MPa) | 92 | 94 | 60 | 65 | 52 | 54 | 120 | 73 | | |
| Surface property | ◎ | ◎ | ◎ | ◎ | ◎ | X | X | ◎ | | |
| Dimensional stability | ◎ | ◎ | Δ | Δ | ◎ | ◎ | X | ◎ | | |

[*1]"NotV" denotes being below UL-94 V standards.
*2: No composition was obtained.

TABLE 8

| Comparative Example No. | | 11 | 12 | 13 | 14 | 15 |
|---|---|---|---|---|---|---|
| Ingredients (part) | | | | | | |
| Polycarbonate resin (A) | PC-2 | 85 | 85 | 85 | 40 | 85 |
| Aromatic polyester resin (B) | PET-1 | 15 | 15 | 15 | 60 | 15 |
| Silicate compound (C) | MIC-1 | 16 | 16 | 16 | 16 | 16 |
| Organic phosphorus flame retarder (D) | P-1 | — | 35 | 7 | 7 | 7 |
| Elastomeric resin (E) | EEA-1 | 5 | 5 | 20 | 5 | 5 |
| Epoxy compound (F) | EP-3 | — | — | — | — | 25 |
| Others | AO-60 | 0.2 | 0.2 | 0.2 | 0.2 | 0.2 |
| | HF-10 | 0.3 | 0.3 | 0.3 | 0.3 | 0.3 |
| Evaluation Results | | | | | | |
| Flame resistance | | not V[*1] | V-0 | not V[*1] | V-2 | *2 |
| Gasoline resistance | | ○ | X | ○ | ○ | |
| Oil resistance | | ○ | X | ○ | ○ | |
| Chemical resistance | | ○ | X | ○ | ○ | |

[*1]"Not V" denotes being below UL-94 V standards.
*2: No test specimen was obtained.

From Tables 1 to 4, it is understood that the obtained compositions according to the present invention are all excellent in flame resistance, anti-drip property, heat resistance and mechanical strength. It is also understood that the impact resistance is improved by the addition of elastomeric resin (E), and the solvent resistance is further improved by the addition of epoxy compound (F). Further, from Table 5, it is understood that compositions having an excellent chemical resistance and the like are obtained when a copolymer of an olefin and an alkyl (meth)acrylate is used as the elastomeric resin (E).

As shown in Table 7, since the aromatic polyester resin (B) is not incorporated in Comparative Examples 1 and 2, the compositions are poor in salad oil resistance. In Comparative Examples 3 and 4, since the amount of the polycarbonate resin (A) is small so that the (A)/(B) ratio is outside the scope of the present invention, the compositions are poor in heat resistance and tensile strength (mechanical strength) and also insufficient in dimensional stability. In Comparative Example 5, the silicate compound (C) is not used and, therefore, the anti-drip property, heat resistance and mechanical strength are lowered. In Comparative Example 6, a fluorine-containing polyolefin is used instead of the silicate compound (C), but it is found that the tensile strength is lowered and the surface property of the obtained molding is also deteriorated. Further, since a glass fiber is used instead of the silicate compound (C) in Comparative Example 7, the anti-drip property, surface property and dimensional stability are poor. In Comparative Examples 8 and 9, no resin composition was obtained, since the amount of the silicate compound (C) or the organic phosphorus based flame retarder (D) is outside the scope of the present invention, so the kneading processing by the extruder was difficult.

INDUSTRIAL APPLICABILITY

The flame retarded thermoplastic resin composition of the present invention can exhibit an excellent flame resistance and an excellent anti-drip property without containing a halogen atom and, in addition, is excellent in heat resistance, mechanical strength, solvent resistance, surface property of moldings and dimensional stability of moldings and, therefore, can be suitably used as moldings for household electric appliances, office automation equipment parts, audio-visual equipment parts, automobile parts and the like.

What is claimed is:

1. A flame retarded thermoplastic resin composition comprising:
(R) a thermoplastic resin comprising (A) a polycarbonate resin and (B) an aromatic polyester resin in an (A)/(B) ratio of 99/1 to 50/50 by weight,
(C) 0.5 to 100 parts by weight of a silicate compound, and
(D) 0.5 to 30 parts by weight of an organic phosphorus based flame retarder, respectively, per 100 parts by weight of said thermoplastic resin (R), said organic phosphorus based flame retarder being at least one member selected from the group consisting of a phosphate, a phosphonate, a phosphinate, a phosphine oxide, a phosphonite, a phosphinite and a phosphine.

2. The composition of claim 1, wherein said silicate compound (C) is a mica having a weight average flake size of 1 to 40 μm.

3. The composition of claim 1, wherein said silicate compound (C) is a talc having a weight average particle size of at least 1.0 μm and a bulk specific volume of at most 8.0 ml/g.

4. The composition of any of claims 1 to 3, wherein said organic phosphorus based flame retarder (D) is a phophoric acid ester of the formula (I):

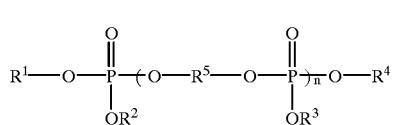

(I)

wherein $R^1$ to $R^4$ are a monovalent aromatic or aliphatic group, $R^5$ is a bivalent aromatic group, n is 0 to 16, and n groups $R^3$ and n groups $R^5$ may be the same or different, respectively.

5. The composition of claim 4, wherein said organic phsophorus based flame retarder (D) is a condensed phosphoric acid ester shown by the formula (I) in which n is from 1 to 16.

6. The composition of any of claims 1 to 3, which further contains (E) at most 15 parts by weight of an elastomeric resin per 100 parts by weight of said thermoplastic resin (R) comprising the components (A) and (B).

7. The composition of any of claims 1 to 3, which further contains (F) at most 10 parts by weight of an epoxy compound containing substantially no halogen atom in the molecule per 100 parts by weight of said thermoplastic resin (R) comprising the components (A) and (B).

8. The composition of any of claims 1 to 3, wherein said aromatic polyester resin (B) is a polyalkylene terephthalate resin containing at least 80% by weight of alkylene terephthalate units.

9. The composition of claim 6, wherein said elastomeric resin (E) is a copolymer comprising units of at least one olefin and units of at least one alkyl (meth)acrylate having a $C_1$ to $C_{10}$ alkyl group.

10. The composition of claim 7, wherein said elastomeric resin (E) is a copolymer comprising units of at least one olefin and units of at least one alkyl (meth)acrylate having a $C_1$ to $C_{10}$ alkyl group.

11. The composition of claim 8, wherein said elastomeric resin (E) is a copolymer comprising units of at least one olefin and units of at least one alkyl (meth)acrylate having a $C_1$ to $C_{10}$ alkyl group.

* * * * *